Feb. 16, 1971   D. S. BREED   3,563,022
SHEAR FLOW DASHPOT TIMER
Filed Aug. 18, 1969   2 Sheets-Sheet 1

INVENTOR
DAVID S. BREED
BY
Kane, Dalsimer, Kane, Sullivan + Kurucz
ATTORNEYS

Feb. 16, 1971   D. S. BREED   3,563,022
SHEAR FLOW DASHPOT TIMER
Filed Aug. 18, 1969   2 Sheets-Sheet 2

INVENTOR
DAVID S. BREED
BY
ATTORNEYS

United States Patent Office 3,563,022
Patented Feb. 16, 1971

3,563,022
SHEAR FLOW DASHPOT TIMER
David S. Breed, Box 270, Hillcrest Road, R.D. 2,
Boonton, N.J. 07005
Filed Aug. 18, 1969, Ser. No. 851,010
Int. Cl. G04f 1/00
U.S. Cl. 58—1                                    17 Claims

ABSTRACT OF THE DISCLOSURE

The dashpot timer of this invention includes a substantially cylindrical glass tube in which travels a piston having a diameter slightly less than that of the interior of the tube. A liquid, gum, grease or compound covers the interior surface of the cylinder in which the piston is adapted to travel. The flow ingenerated in the cylinder is predominantly a shear flow with the pressure flow being relatively insignificant. The device of the present invention operates in the lubrication region whereby relatively small timers are capable of providing delays up to several seconds or more.

---

The subject invention relates to a shear flow dashpot which utilizes the clearance between a ball or axi-symmetric piston and an interior cylindrical wall as a place where the liquid is sheared.

Pressure flow dashpots utilizing a gas or liquid as the metering fluid are known in the art and are described in Pat. No. 3,171,245 and application Ser. No. 816,132 filed Dec. 9, 1968. Such gas dashpots are finding wide acceptance for certain time delays or where available space is no problem. Applications requiring relatively long delays, ranging up to several days, months or longer times, and where space allocations are of an absolute minimum, the liquid dashpot timer has been found to be eminently satisfactory. For cases where space allocations are of an absolute minimum and where the desired time delay is short, ranging from a few milliseconds to a few seconds, timers heretofore unavailable and unrealized are necessary. For these short minimum space time delays, shear flow dashpot timers of this invention have been found to be eminently satisfactory.

Although short time delays could theoretically be achieved using the liquid annular orifice of the above application, the fluid used would be of such a low viscosity as to require sealing since the low viscosity silicone fluid would otherwise eventually leak over long periods of time. Seals and/or leakage of this type may not be desirable in a number of applications. The timer of the present invention does not require a seal nor is there a leakage over prolonged periods of time.

The shear flow dashpot is also desirable in that it is relatively insensitive to changes in ambient pressure.

An understanding of the particular nature of the shear flow passed a ball or piston as it descends along the wall of a cylinder is important in determining the predictability and accuracy of the rate of descent. The type of flow that the present invention utilizes is generally termed shear flow. For this case, the liquid velocities are at low Reynolds numbers in which viscous forces are predominant over inertial forces. The different types of shear flows are distinguished essentially by the nature of the force which restricts the motion of the piston. Reference is made to the textual treatment of creeping motions in Boundary Layer Theory—McGraw-Hill Series of Mechanical Engineering by Dr. Hermann Schlicting—Fourth Edition— Published by McGraw-Hill Book Company, Inc., New York, N.Y., and particularly Chapters IV and VI thereof, all of which is incorporated herein by reference.

One type of shear flow utilizes a large clearance such that the major resistance to the motion of the piston comes from the shear flow of the fluid around the piston. It is a two-dimensional flow and the exact positioning of the piston in the cylinder is unimportant except when it gets extremely close to the cylinder wall. This type of shear flow in fluid dynamics is characterized by the fact that the cylinder walls and the clearance between the piston and the cylinder do not effect the motion of the piston.

Another type of shear flow utilizes the clearance between the piston and the cylinder and is based on the hydrodynamic theory of lubrication. When the clearance is very small, the flow is essentially one dimensional; and the forces caused by the shear stress on the piston surface in close proximity to the wall dominate. Thus, the essential characteristic of shear flow in the lubrication region compared to the type of shear flow mentioned earlier is that in the latter case the total of the distributed shear forces over the entire piston creates the drag force which dominates all other forces whereas in the lubrication region, the force created by the shear stress on the piston surfaces in the immediate vicinity of the cylinder walls dominates. The basic determining factor is thus the clearance between the piston and the cylinder. For shear flow of the first type, the ratio of the clearance to the radius of the piston would be about 0.1 or larger whereas for the lubrication region, the ratio of the clearance to the radius would be in the range of .01 or smaller It is, therefore, an object of the present invention to provide a shear flow dashpot which eliminates the disadvantages, limitations and drawbacks of the prior art devices and which is exceptionally reliable, susceptible to long life and relatively inexpensive to manufacture.

The shear flow dashpot of the subject invention has been successfully utilized in a short term time delay system. This shear flow dashpot is characterized by a cylinder open at both ends or an open center piston. This is distinguished from a pressure flow dashpot which is characterized by a closed end cylinder.

Other objects and advantages will become apparent from the following detailed description which is to be taken in conjunction with the accompanying drawings illustrating an exemplary preferred embodiment of the invention and in which.

Figure 1:
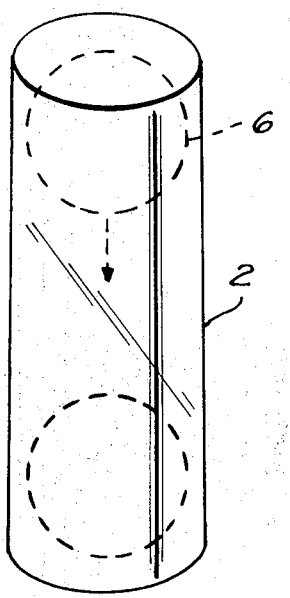
FIG. 1 is a diagrammatic perspective view of a dashpot incorporating the teachings of the invention utilizing a spherical piston the initial and terminal position of which for the prescribed time delay being shown in dotted lines.
Figure 2:
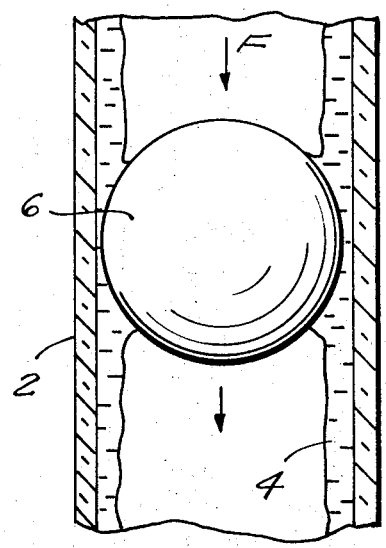
FIG. 2 is an enlarged fragmentary longitudinal sectional view of this dashpot showing the internally disposed spherical piston shearing the selected liquid, grease or compound to an applied force.
Figure 3:
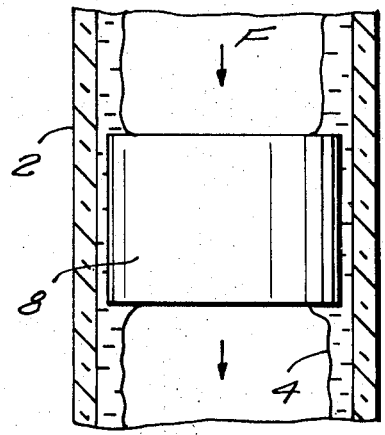
FIG. 3 is a similar view showing a cylindrical piston.
Figure 3A:
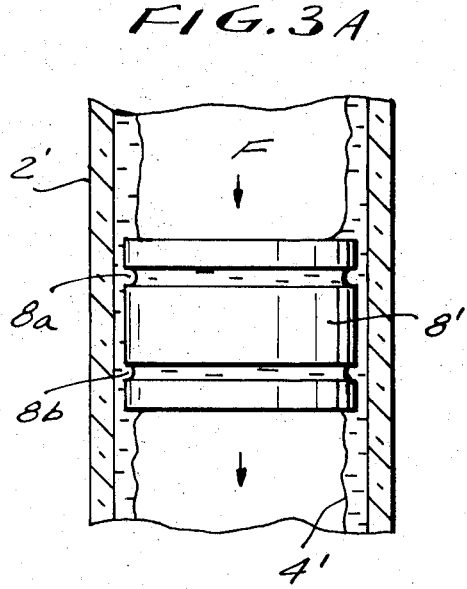
FIG. 3a is a similar view showing an alternate embodiment of piston.
Figure 4:
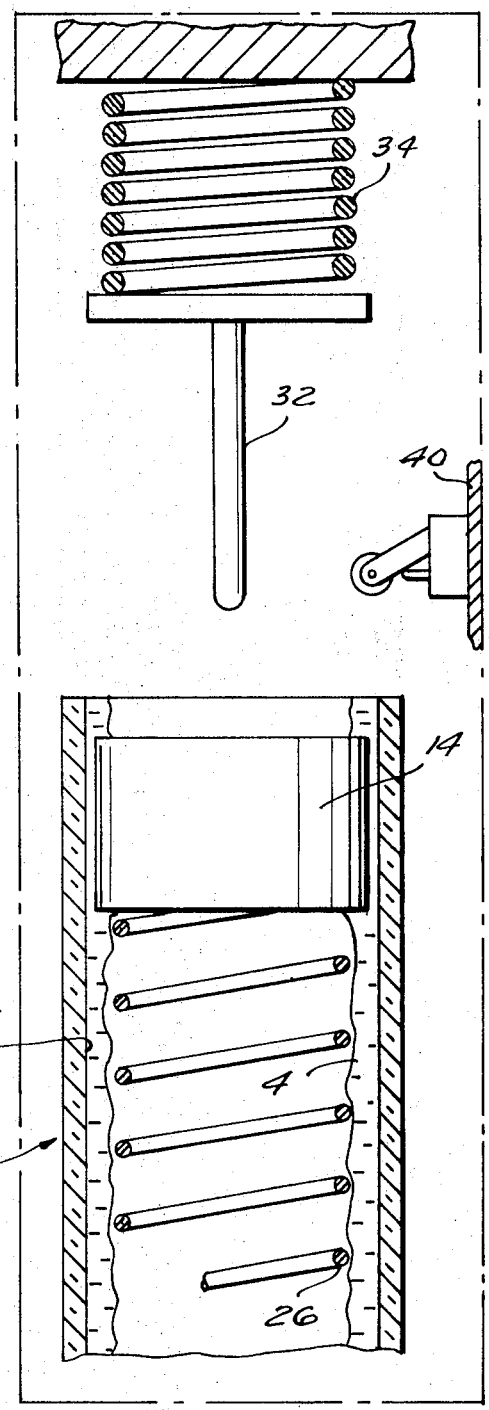
FIG. 4 is a longitudinal sectional view illustrating the dashpot employed in an exemplary embodiment employing a needle prior to the initiation of the time delay sequency.
Figure 5:
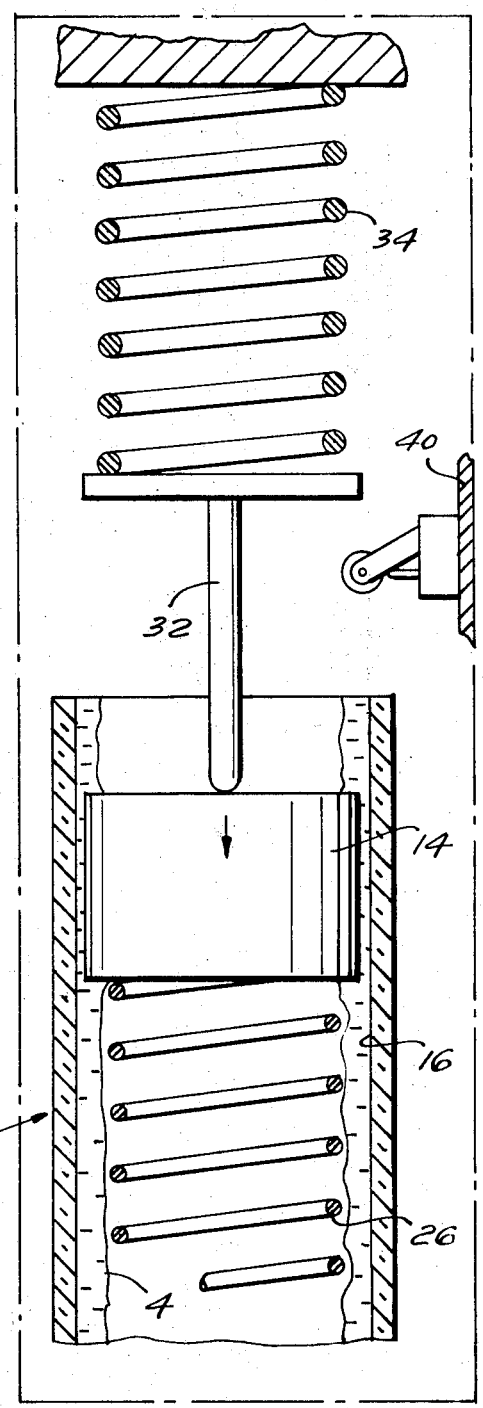
FIG. 5 is a view similar to FIG. 4 but showing the device after the delay sequence has been initiated.

Referring now to FIGS. 1 to 3, a dashpot timer of this invention will include an outer cylinder 2 having a coating of a liquid, grease or compound 4 therein through which a piston is adapted to travel under an applied force F. This piston may assume the form of a sphere 6 or cylinder 8. The piston also defines with the inner surface of the cylinder's relatively small annular clearance through which the liquid, grease or compound is sheared. It is important to note that in the dashpot of the present invention, shear sress is significantly present on boh piston and cylinder.

Greases and compounds are manufactured from fluids by the addition of soaps and powders, respectively. The fluids used could be any fluid, however, for the present application the silicone fluids are preferred. Mercury also has application. The powders used vary from silica, alumina, titanium dioxide, zinc oxide, graphite, molybdenum, cornstarch or Teflon powder, among others. All of these materials, greases and compounds are commercially available. Of course, additional fluids, soaps or powders can be added to alter the character of the basic grease or compound. The General Electric Company markets a suitable material usable herein known as Insul Grease which has a silicone base and filler of zinc oxide powder.

The viscosity of polymer fluids (such as silicones), greases and compounds, especially at high shear rates is not always a simply defined number. In addition to depending on temperature, the viscosity can also be a function of the shear rate and, in some cases, the past history of the sample. For most polymer fluids, greases and compounds, the viscosity decreases with increasing shear rates. For some compounds, however, the viscosity increases for increasing shear rate. These are called dilatant materials. Dilatant fluids are quite desirable for some special applications where a given force velocity relationship is desired in a dashpot timer. Also for greases and compounds, there exist a minimum yield stress above which the material will not flow at all. In fact, it is because of this yield stress that makes greases and compounds so desirable for use in certain applications since they will not flow under their own weight and thus remain indefinitely on the surfaces of the piston and cylinder. Heavy polymer fluid in thin films would probably also remain indefinitely on the surfaces due to adhesion between the molecules and the substrate. Thus, liquids of the type usable with this invention also possess the advantage of reducing if not eliminating entirely any leakage problem. This is accomplished by employing a liquid that does not evaporate whereupon adhesion between the liquid and adjacent dashpot surfaces will maintain the liquid in place. In addition, greases are peculiarly applicable also because they will not flow unless they experience certain threshold shearing stresses greater than they see from their own weight which is a rare occurrence in the contemplated application.

A plunger 32 is mounted externally of the cylinder, is designed to travel along its axis and, in the illustrated embodiment, is powered by a spring 34.

Upon initiation of the timing sequence, a suitable mechanism (not illustrated) releases the plunger which enters the cylinder and strikes the piston 14. By design, the force exerted by the spring 34 is somewhat larger than the threshold shear force required to cause the grease to begin flowing such that the piston descends along the cylinder at a controlled rate. Thus, the distance which the plunger 32 has traveled along its axis provides a convenient measure of elapsed time. Through the use of conventional mechanisms, the plunger can be utilized to trigger various devices, such as an arming mechanism or the like of a mine or other ordnance item 40.

The interior wall 16 of the cylinder may, if desired, comprise two or more portions of differing diameters. Thus, in the illustrated embodiment, the interior wall 16 may have an upper portion of relatively large diameter and a lower portion of a relatively reduced diameter. By reason of this structure, the piston will descend through the upper portion of the cylinder more rapidly than through the lower portion. In a mine, for example, this feature can be utilized to release an arming mechanism after a few milliseconds or more and then trigger a self-destruction mechanism at a preselected time thereafter.

While the piston 14 in the drawings is illustrated as being in the shape of a cylinder, it is also feasible to use a spherical or other axi-symmetrical piston. Such a spherical piston (or ball) has several advantages over the cylindrical piston. First, the cylindrical piston may tend to catch on the step between the diameter portions. With a ball as the piston, this would be eliminated. Finally, a spherical piston cannot cock, should this be a source of inconsistency. Inexpensive spherical metal balls are available with very precise dimensions which would also contribute to the manufacturing ease of the dashpot.

The motion of the piston depends on the geometrical characteristics of the particular device expressed through the defining equation for viscosity. The viscosity of a fluid can be defined by the relation $$\tau_x = \mu \frac{du}{dy}$$

For the case where the clearance in the region of interest is small compared with the radius, $$\frac{du}{dy} = \frac{u}{h}$$

The shear stress is defined as the force per unit area in the $x$ direction, thus $$\tau_x = \frac{f_x}{R d\theta dx}$$

Substituting and solving for the force, $$f_x = \iint \frac{\mu u}{h} R d\theta dx$$

Where:

$h$ = local clearance (a function of $x$ and $\theta$)
$f_x$ = the force on the piston in the $x$ direction
$u$ = the velocity of the piston
$R$ = the radius of the piston
$\theta$ = angular coordinate along the circumference
$x$ = coordinate along cylinder axis The particular geometry of a given device enters through the clearance function $h(X, \theta)$. For the particular case of a spherical piston, this clearance function $h(X, \theta)$ can be approximated by:

$$h = c + e \cos \theta + \frac{X^2}{2R}$$

where:

$c$ = mean radial clearance
$e$ = distance between the cylinder axis and the sphere center.

For the spherical case, the relation between F and $u$, therefore is $$F = \frac{\mu u R^{3/2}}{\sqrt{2}} \int_0^{2\pi} \frac{d\theta}{\sqrt{c + e \cos \theta}}$$

Which for the case where the ball is centered in the cylinder is:

$$F = \frac{\sqrt{2} \pi \mu u R^{3/2}}{\sqrt{h}}$$

Similarly, for the case of a centered cylindrical piston, the above equations reduce to:

$$F = \frac{2\pi \mu u R L}{h}$$

where L is the length of the piston.

Further analysis of the above equations will show that the rate of piston travel for a given applied force will vary with the location of the piston in the cylinder. A more complete analysis for the ball piston case shows that hydrodynamic forces tending to center the ball exists whose magnitude depends on the ball velocity and fluid viscosity.

In the case of a cocked cylindrical piston, the above equations do not apply but, nevertheless, shear flow in the lubrication region remains.

For most devices contemplated, the radius would be less than about ½ inch. The clearance $h$ would probably never exceed .001″. The viscosity $\mu$ could vary from 100 centipoises to over 100 million centipoises. However, for most of the devices, the lower limit would probably be about 1000 centipoises. For conversion purposes, centistokes×density=centipoises and 1,000,000 centipoises=.14 lb. sec./in.² The usable rubber gums, greases and compounds range in viscosity from 100 million centistokes to 1000 whereas the usable silicone fluids range in viscosity from .65 centistokes to 2.5 million centistokes. Gums, greases, fluids and compounds of these or equivalent types are available commercially.

For most applications, however, some degree of temperature compensation would be necessary. In order to achieve temperature compensation, the ratio of the radius of the ball R to the mean radial clearance $h$ would have to exceed 100/1. The viscosities of the optimum fluids change by a factor of 35 to 1 over a temperature range of −65° F. to 160° F. and some greases and compounds change somewhat less. The viscosity of most polymer fluids and the greases and compounds depends, of course, on the shear rate.

In addition, cylindrical grooves 8a and 8b may be used in the piston 8'. These would serve one or both of the two following functions. Grooves serve to retain the grease 4' or compound so that when the piston moves there is a continuous feeding of this material onto the adjacent surfaces thus preventing piston and cylinder surface-to-surface contact. The grooves could serve to provide load carrying capacity similar to slider bearings and for a whole class of bearings called spiral-groove bearings. The depth of these grooves for this second use is on the order of the clearance between the piston and cylinder for the present invention. Consequently, they are rather shallow grooves.

Another successful application having a time delay of approximately two seconds utilizes a cylinder having an internal diameter of one-eighth inch and a cylindrical piston having a length of perhaps about two-tenths of an inch. The total device would be approximately four-tenths of an inch long.

In another particularly successful embodiment, the piston travels a distance of .060 inch in approximately 50 milliseconds.

The cylinder 2 is preferably made from glass or other ceramic material, since precision glass tubes are readily available. However, other materials could also be utilized. This is certainly true of the piston where either metal, ceramic including glass or plastic or any combination thereof can be used.

In summary, the present invention accomplishes and contributes the following advantages to the dashpot timer art:

(1) Position of ball travel: The ball will travel considerably faster if it travels near the center of the tube as opposed to near the side. The contemplated method of pushing the ball assures that the ball will be pushed with as little side force as possible.

(2) Temperature compensation: (how achieved) The viscosity of the best fluids change by a factor of 35 to 1 over the temperature range −65° F., to 160° F. with the best greases changing somewhat less. Even over a very limited temperature range, the fluid viscosity changes about 1%/° F. to 1.5%/° F. Consequently, if accuracy is to be achieved even over limited temperature ranges, some degree of temperature compensation is necessary.

(3) Piston rates: For most of the devices of the present invention, the rate of travel of the piston will be on the order of .05 inch per second to 5 inches per second.

(4) Physical size: With the present invention, time delays are achieved which are significantly shorter with a significantly smaller dashpot than has ever been done before. The clearance range utilized and envisioned is approximately one order magnitude smaller than has ever been used before with the exception of the liquid and pneumatic annular orifice dashpots.

(5) Sealing: Liquid dashpots have failed in military applications generally because of the inability to seal silicone fluids from leakage. With the use of a thin layer of fluid held on the surfaces by surface forces or a grease or compound, no sealing would be necessary.

(6) Military applications: based on present knowledge, no shear flow dashpot has been successfully applied to a military fuse in the past. Other applications may other than one-time use dashpot timer applications may be found in the above identified patent and patent application.

(7) Precision glass tube: Based on present knowledge, no shear flow dashpots have been made wherein the cylinder is a precision glass tube. Where glass tubes have been utilized in the past, they have been exercising creeping flow not in the lubrication region where the cylinder I.D. is relatively unimportant; or pressure flow.

Although a preferred embodiment of this invention has been described and illustrated herein, it should be understood that this invention is in no sense limited thereby but its scope is to be determined by that of the appended claims.

I claim:

1. A shear flow dashpot timer comprising:
   a cylinder having a substantially cylindrical interior wall;
   a piston disposed in said cylinder and having an outer diameter slightly less than the diameter of said interior wall whereby a substantially annular orifice is defined between the piston and cylinder;
   a substance of relatively large viscosity on interior surfaces of the dashpot and through which the piston is adapted to move with the relative flow of the substance being shear flow in the lubrication region which involves liquid motions at low Reynolds numbers and in which viscous forces are predominant over inertial forces.

2. The invention in accordance with claim 1 wherein the piston is substantially spherical and the piston rate of travel being defined by the following equation:

$$F = \int \int \frac{\mu u}{h} R \, d\theta \, dx$$

when the piston is centered relative to the cylinder during its travel therein and means are provided to assure sufficient hydrodynamic forces to approximately center the piston in the cylinder where R is the radius of the piston, F is the axial force applied to the piston, $\mu$ is the viscosity of the substance, $h$ is the mean radial clearance between the piston and cylinder, and $u$ is the velocity of the piston.

3. The invention in accordance with claim 2 wherein R is less than about ½ inch.

4. The invention in accordance with claim 1 wherein the cylinder is open at both of its ends.

5. The invention in accordance with claim 2 wherein $h$ is less than .001 inch.

6. The invention in accordance with claim 2 wherein $\mu$ is of a value from .65 centistoke to 100 million centistokes.

7. The invention in accordance with claim 6 wherein the substance is selected from the group consisting of rubber gums, greases or compounds ranging in viscosity from 1000 to over 100 million centistokes and silicone fluids ranging in viscosity from .65 centistoke to 2.5 million centistokes.

8. The invention in accordance with claim 7 wherein means are included for temperature compensation to offset the effect of change of viscosity of the substance upon the rate of travel of the piston resulting from changes in temperature, such means embracing a ratio in excess of 100 to 1 of the radius of the piston to the mean radial clearance $h$.

9. The invention in accordance with claim 1 wherein the piston is grooved to receive said substance.

10. The invention in accordance with claim 1 wherein the piston is substantially cylindrical and the piston rate of travel through the substance being defined by the following equation:

$$F = \frac{2\pi\mu u R L}{h}$$

when the piston is centered relative to the cylinder during its travel therein where L is the length of the cylinder, R is the radius of the piston, F is the axial force applied to the piston, $\mu$ is the viscosity of the substance, $h$ is the means radial clearance between the piston and cylinder, and $u$ is the velocity of the piston.

11. The invention in accordance with claim 10 wherein R is less than about ½ inch.

12. The invention in accordance with claim 10 wherein the mechanism of an ordance item is coupled with the dashpot timer to receive a predetermined time delay therefrom.

13. The invention in accordance with claim 10 wherein $h$ is less than .001 inch.

14. The invention in accordance with claim 10 wherein $\mu$ is of a value from .65 centistoke to 100 million centistokes.

15. The invention in accordance with claim 10 wherein the substance is selected from the group consisting of rubber gums, greases or compounds ranging in viscosity from 1000 to over 100 million centistokes and silicone fluids ranging in viscosity from .65 centistoke to 2.5 million centistokes.

16. The invention in accordance with claim 10 wherein means are included for temperature compensation to offset the effect of change of viscosity of the substance upon the rate of travel of the piston resulting from changes in temperature, such means embracing a ratio in excess of 100 to 1 of the radius of the piston to the mean radial clearance $h$.

17. The invention in accordance with claim 16 wherein the viscosity of the substance changes by a factor of 35 to 1 over the temperature range of —65° F. to 160° F. and less for the greases and compounds.

References Cited

UNITED STATES PATENTS

| | | | |
|---|---|---|---|
| 3,166,839 | 1/1965 | Dock et al. | 58—144 |
| 3,171,245 | 3/1965 | Breed | 58—144 |
| 3,458,992 | 8/1969 | Breed | 58—1 |

RICHARD B. WILKINSON, Primary Examiner

E. C. SIMMONS, Assistant Examiner

U.S. Cl. X.R.

58—144; 188—139, 166